US012682358B2

(12) United States Patent
Ahsan et al.

(10) Patent No.: US 12,682,358 B2
(45) Date of Patent: Jul. 14, 2026

(54) EVALUATING HYDROCARBON EXPLORATION AND RECOVERY OPERATIONS FLUIDS BASED ON CARBON FOOTPRINT

(71) Applicant: Baker Hughes Oilfield Operations LLC, Houston, TX (US)

(72) Inventors: Muhammad Ahsan, Ontario (CA); Edgar Luna, Houston, TX (US)

( * ) Notice: Subject to any disclaimer, the term of this patent is extended or adjusted under 35 U.S.C. 154(b) by 214 days.

(21) Appl. No.: 18/355,886

(22) Filed: Jul. 20, 2023

(65) Prior Publication Data

US 2024/0046282 A1 Feb. 8, 2024

Related U.S. Application Data

(60) Provisional application No. 63/395,975, filed on Aug. 8, 2022.

(51) Int. Cl.
*G06Q 30/018* (2023.01)
*E21B 21/06* (2006.01)
*G06Q 50/06* (2024.01)

(52) U.S. Cl.
CPC ......... *G06Q 30/018* (2013.01); *E21B 21/066* (2013.01); *E21B 21/068* (2013.01); *G06Q 50/06* (2013.01)

(58) Field of Classification Search
CPC .... G06Q 30/018; G06Q 50/06; E21B 21/066; E21B 21/068
See application file for complete search history.

(56) References Cited

U.S. PATENT DOCUMENTS

| | | | |
|---|---|---|---|
| 8,471,197 B2 | 6/2013 | Inanc et al. | |
| 8,548,785 B2 | 10/2013 | Chugunov et al. | |
| 8,818,777 B2 | 8/2014 | Howell et al. | |
| 9,556,856 B2 | 1/2017 | Stewart et al. | |
| 2009/0014170 A1 | 1/2009 | Zubrin et al. | |
| 2012/0290273 A1 | 11/2012 | Arjona et al. | |
| 2013/0106117 A1 | 5/2013 | Sites | |
| 2014/0262510 A1* | 9/2014 | Beddoes | E21B 21/06 175/48 |
| 2018/0238153 A1 | 8/2018 | Nevison | |
| 2021/0102815 A1* | 4/2021 | Spielman | G01C 21/3423 |

(Continued)

OTHER PUBLICATIONS

Gilbert, Y., M. Hagström, and J. M. Getliff. "Reducing the carbon footprint of drilling and completion operations. SPE International Conference and Exhibition on Health, Safety, Environment, and Sustainability" SPE, 2010. (Year: 2010).*

(Continued)

*Primary Examiner* — Michael P Harrington
*Assistant Examiner* — Brian A Tallman
(74) *Attorney, Agent, or Firm* — Baker Hughes Company

(57) ABSTRACT

Examples described herein provide for evaluating greenhouse gas emissions for a fluid for a hydrocarbon exploration and recovery operation. The method includes performing an emissions lifecycle analysis for the drilling and completion fluid. The method further includes determining a greenhouse gas emissions value for the drilling and completion fluid based at least in part on a result of the emissions lifecycle analysis. The method further includes modifying a portion of the hydrocarbon exploration and recovery operation based at least in part on the greenhouse gas emissions value.

19 Claims, 7 Drawing Sheets

(56) References Cited

U.S. PATENT DOCUMENTS

| | | | | |
|---|---|---|---|---|
| 2022/0290550 | A1* | 9/2022 | Ba ........................... | G06F 30/20 |
| 2022/0373176 | A1* | 11/2022 | Al-Shaiji ............ | E21B 41/0071 |
| 2023/0037091 | A1* | 2/2023 | Jandhyala .............. | G06Q 50/08 |
| 2023/0092645 | A1* | 3/2023 | Holmgren .............. | C08G 63/78 |
| | | | | 435/157 |
| 2023/0131645 | A1* | 4/2023 | Sanchez ............ | G06Q 30/0277 |
| | | | | 701/1 |
| 2023/0193743 | A1* | 6/2023 | Katterbauer .......... | E21B 43/164 |
| | | | | 702/6 |
| 2024/0028599 | A1* | 1/2024 | Aurongzeb ....... | G06F 16/24575 |

OTHER PUBLICATIONS

El-Houjeiri, Hassan M. et al., "Oil Production Greenhouse Gas Emissions Estimator"; OPGEE v. 2.0c; California Environmental Protection Agency; Jun. 20, 2018; 220 pages.

Notification of Transmittal of the International Search Report and the Written Opinion of the International Searching Authority, or the Declaration; PCT/US2023/028520; Mail Date: Nov. 7, 2023; 9 pages.

Nunez-Lopez, Vanessa et al., "Final Report: Carbon Life Cycle Analysis of CO2-EOR for Net Carbon Negative Oil (NCNO) Classification;" US Department of Energy, Apr. 1, 2019; 117 pages.

Skone, Timothy J., P.E et al., Development of baseline data and analysis of life cycle greenhouse gas emissions of petroleum-based fuels, National Energy Technology Laboratory, Nov. 26, 2008; pp. 310.

Xunmin Ou et al., Life-Cycle Energy Use and Greenhouse Gas Emissions Analysis for Bio-Liquid Jet Fuel from Open Pond-Based Micro-Algae under China Conditions, MDPI, Energies 2013, 6(9), 4897-4923; https://doi.org/10.3390/en6094897, Sep. 23, 2013; pp. 4897, 4904, 4917-4918.

* cited by examiner

300

301

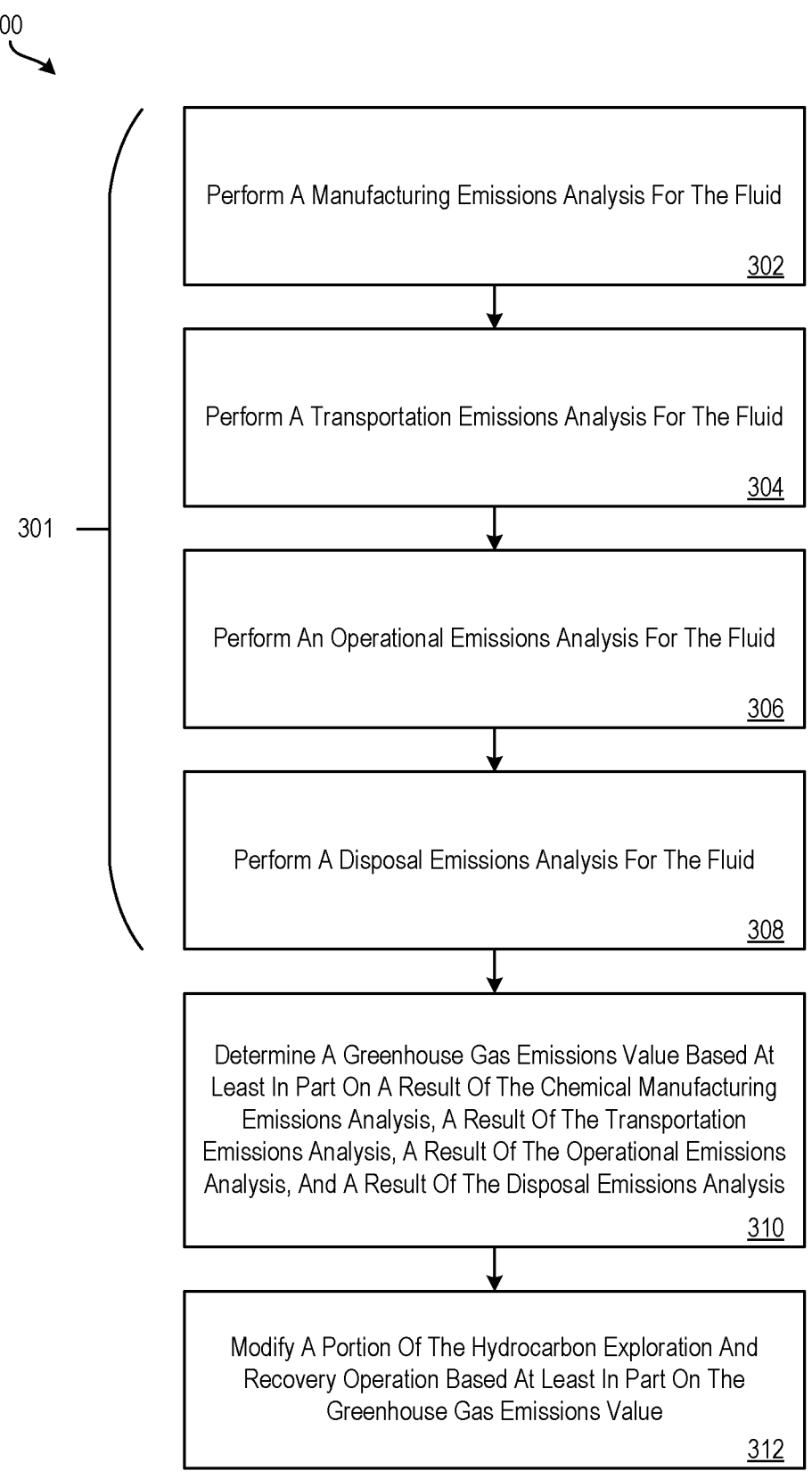

Perform A Manufacturing Emissions Analysis For The Fluid

302

Perform A Transportation Emissions Analysis For The Fluid

304

Perform An Operational Emissions Analysis For The Fluid

306

Perform A Disposal Emissions Analysis For The Fluid

308

Determine A Greenhouse Gas Emissions Value Based At Least In Part On A Result Of The Chemical Manufacturing Emissions Analysis, A Result Of The Transportation Emissions Analysis, A Result Of The Operational Emissions Analysis, And A Result Of The Disposal Emissions Analysis

310

Modify A Portion Of The Hydrocarbon Exploration And Recovery Operation Based At Least In Part On The Greenhouse Gas Emissions Value

EVALUATING HYDROCARBON EXPLORATION AND RECOVERY OPERATIONS FLUIDS BASED ON CARBON FOOTPRINT

CROSS-REFERENCE TO RELATED APPLICATIONS

This application claims the benefit of U.S. Provisional Application Ser. No. 63/395,945 filed Aug. 8, 2022, the disclosure of which is incorporated herein by reference in its entirety.

BACKGROUND

Embodiments described herein relate generally to downhole exploration and production efforts in the resource recovery industry and more particularly to techniques for evaluating hydrocarbon exploration and recovery operational fluids based on carbon footprint.

Downhole exploration and production efforts involve the deployment of a variety of fluids, such as drilling fluids and completion fluids. Drilling fluids, also referred to as drilling mud, are used to drill a borehole in an earth formation. Drilling fluids can be liquids, gasses, and/or mixtures of liquids and solids. Completion fluids are used to complete a well prior to initiating hydrocarbon production. Completion fluids can be brines or any other suitable fluid. Drilling fluids and completion fluids typically have different properties (e.g., solids content, density, pH, chemical composition, etc.). Both drilling fluids and completion fluids are made from various chemical elements, compounds, and the like according to the desired properties of the final fluid to drill a particular section of formation.

SUMMARY

In one exemplary embodiment, a method is provided for evaluating greenhouse gas emissions for a fluid for a hydrocarbon exploration and recovery operation. The method includes performing an emissions lifecycle analysis for the drilling and completion fluid. The method further includes determining a greenhouse gas emissions value for the drilling and completion fluid based at least in part on a result of the emissions lifecycle analysis. The method further includes modifying a portion of the hydrocarbon exploration and recovery operation based at least in part on the greenhouse gas emissions value.

In another exemplary embodiment a system includes a memory storing computer readable instructions and a processing device for executing the computer readable instructions. The computer readable instructions control the processing device to perform operations for evaluating greenhouse gas emissions for a fluid for a hydrocarbon exploration and recovery operation. The operations include performing a manufacturing emissions analysis for the fluid. The operations further include performing a transportation emissions analysis for the fluid. The operations further include performing an operational emissions analysis for the fluid. The operations further include performing a disposal emissions analysis for the fluid. The operations further include determining a greenhouse gas emissions value for the fluid based at least in part on a result of the manufacturing emissions analysis, a result of the transportation emissions analysis, a result of the operational emissions analysis, and a result of the disposal emissions analysis. The operations further include modifying a portion of the hydrocarbon exploration and recovery operation based at least in part on the greenhouse gas emissions value.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures:

FIG. 3 depicts a flow diagram of a method for evaluating hydrocarbon exploration and recovery operational fluids based on carbon footprint according to one or more embodiments described herein;

DETAILED DESCRIPTION

Figure 1:
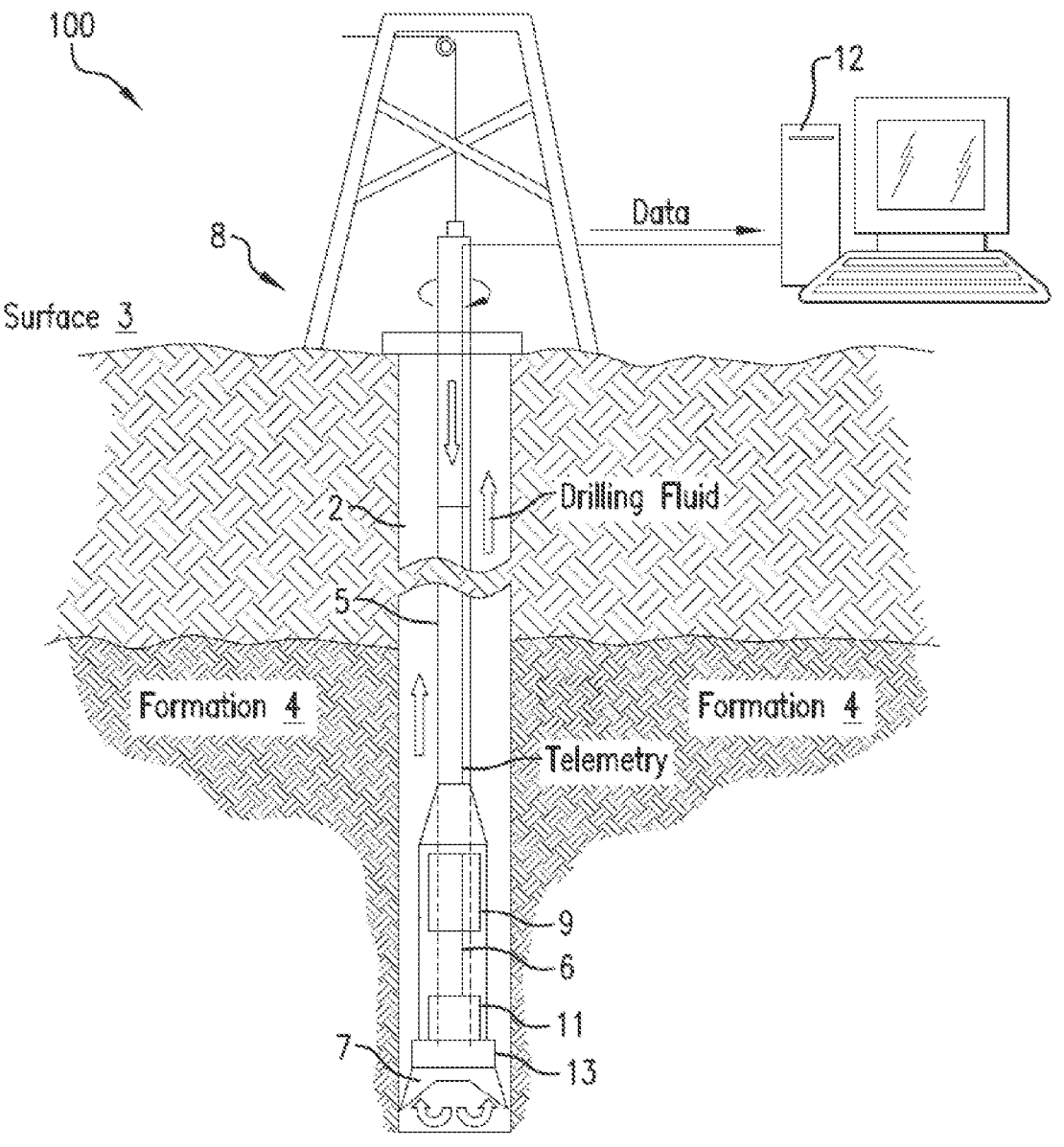
FIG. 1 depicts a cross-sectional view of a wellbore operation system according to one or more embodiments described herein.

The combustion of natural gas produces approximately half the greenhouse gas (GHG) emissions of coal. There has been increasing concern over the environmental burdens that result from natural gas exploration and production. Drilling fluids used in hydrocarbon exploration and recovery (e.g., drilling fluids, completion fluids, etc.) contribute to the GHG emissions of hydrocarbon exploration and recovery operations. Drilling fluids can contribute to overall GHG emissions at various stages: during manufacture, transportation, use, disposal, and/or the like, including combinations and/or multiples thereof. Conventional approaches for analyzing GHG emissions for hydrocarbon exploration and recovery operations, such as natural gas exploration, do not consider the total carbon footprint of fluids when evaluating GHG emissions. Traditional life cycle assessments for hydrocarbon exploration and recovery operations may account for surface processes in hydrocarbon production but fail to account for subsurface geological constraints and lack engineering design detail.

To address these and other shortcomings of conventional approaches to GHG emissions analysis, one or more embodiments described herein evaluate the emissions of fluids (e.g., drilling fluids, completion fluids, etc.) used in hydrocarbon exploration and recovery operations. One or more embodiments described herein consider geological characteristics, drilling parameters, shipping/logistics, disposal, and/or other constraints to evaluate the carbon footprint of fluids used during hydrocarbon exploration and recovery operations.

One or more embodiments described herein provide for lifecycle analysis (LCA), which is an environmental accounting and planning methodology that addresses multiple forms of energy use and environmental concerns involved with an industrial system from end-to-end. An example of such an industrial system is a hydrocarbon exploration and recovery operation. One or more embodiments described herein consider different types of emissions, such as direct and indirect emissions and process, stationary, and transport emissions. Direct and indirect emissions are types of emissions dependent on the type of chemical formulation of the fluid used. Process, stationary, and transportation emissions cover the extraction/manufacturing process of the fluid and the logistics involved in delivering the fluid for use through different stages of the supply chain.

According to one or more embodiments described herein, techniques for evaluating fluids used for hydrocarbon exploration and recovery operations, such as drilling fluids and completion fluids, based on carbon footprint are provided. According to an embodiment, an emissions lifecycle analysis can be performed for a fluid (e.g., a drilling fluid, a completion fluid, and/or the like, including combinations and/or multiples thereof). The emissions lifecycle analysis can include performing a manufacturing emissions analysis of the fluid, performing a transportation emissions analysis for the fluid, performing an operational emissions analysis for the fluid, and/or performing a disposal emissions analysis for the fluid. Disposal emissions analysis are further performed to break it down to type of mud used in hydrocarbon exploration. Based on one or more of these analyses, a greenhouse gas emissions value can be determined for the fluid. In embodiments, the greenhouse gas emissions value can be used to modify a portion of a hydrocarbon exploration and recovery operation that uses the fluid.

To assess the environmental burdens of drilling and completion fluid operations, a life cycle inventory (LCI) model has been created using the ISO 14040 standards and was used to carry out the life cycle assessment of a given drilling and completion fluid operation. The system boundaries implemented in an example follow a cradle-to grave approach to estimate the carbon dioxide and overall greenhouse gas emissions from drilling and completion fluids operations. The LCI approach accounts for infrastructure installation and production operations, starting from initial raw material extraction through to the stage of waste disposal. The four main phases and related sub-phases considered are manufacturing, transportation, operation, and waste disposal. According to an embodiment, in order to provide a complete assessment of the entire life cycle impact of drilling and completion fluid operations, each activity that takes place, the function of equipment and the corresponding operations within the system boundary are considered.

A high quality set of data is used in drilling and completion fluids life cycle analysis for comparative assertions. This includes addressing one or more of the following data elements: time-related coverage (comparable time effects: duration, diurnal, seasonal, etc.); geographical coverage (comparable geography: weather, terrain, systems, etc.); technology coverage (comparable technical effects: product life cycle systems); data precision (e.g., number of decimal places); completeness (similar product system "reach", scope of life cycle stages); data representativeness (does modeled data truly reflect actual performance?); methodology consistency and reproducibility (standard measurement tests, etc.); and/or the like, including combinations and/or multiples thereof.

The model developed for drilling and completion fluid life cycle analysis aids in the identification of improvement possibilities, decision-making, choice of environmental performance indicators, and market claims. In many projects, this model can also be used in conjunction with other environmental tools (e.g., life-cycle management and life-cycle costing) for policy making, environmental marketing, industrial decision-making, and/or the like, including combinations and/or multiples thereof.

In order to deal with the complexity of drilling and completion fluid life cycle analysis, a model in accordance with one or more embodiments described herein uses an ISO standard on the topic of LCA, which establishes a fixed protocol and methodological framework for performing an drilling and completion fluids LCA study. This includes, for example, goal and scope, inventory analysis, impact assessment and interpretation. Goal and scope definition states the aim of an intended LCA study, the system boundary, the functional unit, the competing systems considered, and the breadth and depth of (or level of detail) the LCA study in relation to this aim. The functional unit is the quantified performance of a product system for use as a reference unit in an LCA study.

One or more embodiments described herein provide techniques for evaluating drilling and completion fluids based on carbon footprint.

Wellbores are drilled into a subsurface to exploit hydrocarbons and for other purposes. In particular, FIG. 1 depicts a cross-sectional view of a wellbore operation system 100, according to aspects of the present disclosure.

The system and arrangement shown in FIG. 1 is one example to illustrate the downhole environment. While the system can operate in any subsurface environment, FIG. 1 shows a carrier 5 disposed in a borehole 2 penetrating the formation 4. The carrier 5 is disposed in the borehole 2 at a distal end of the borehole 2, as shown in FIG. 1.

As shown in FIG. 1, the carrier 5 is a drill string that includes a bottom hole assembly (BHA) 13. The BHA 13 is a part of the operation system 100 and includes drill collars, stabilizers, reamers, and the like, and the drill bit 7. In examples, the drill bit 7 is disposed at a forward end of the BHA 13. The BHA 13 also includes sensors (e.g., measurement tools 11) and electronic components (e.g., downhole electronic components 9). The measurements collected by the measurement tools 11 can include measurements related to drill string operations, for example. BHA 13 also includes a steering tool configured to steer BHA 13 and drill bit 7 into a desired direction. The steering tool may receive steering commands based on which it creates steering forces to push or point drill bit 7 into the desired direction. Operation system 100 is configured to conduct drilling operations such as rotating the drill string and, thus, the drill bit 7. A drilling rig 8 also pumps drilling fluid through the drill string 5 in order to lubricate the drill bit 7 and flush cuttings from the borehole 2. The measurement tools 11 and downhole electronic components 9 are configured to perform one or more types of measurements in an embodiment known as logging-while-drilling (LWD) or measurement-while-drilling (MWD) according to one or more embodiments described herein.

Raw data is collected by the measurement tools 11 and transmitted to the downhole electronic components 9 for processing. The data can be transmitted between the measurement tools 11 and the downhole electronic components 9 by an electrical conduit 6, such as a wire (e.g. a powerline) or a wireless link, which transmits power and/or data between the measurement tools 11 and the downhole electronic components 9. Power is generated downhole by a turbine-generation combination (not shown), and communication to the surface 3 (e.g., to a processing system 12) is cable-less (e.g., using mud pulse telemetry, electromagnetic telemetry, etc.) and/or cable-bound (e.g., using a cable to the processing system 12, e.g. by wired pipes). The data processed by the downhole electronic components 9 can then be telemetered to the surface 3 for additional processing or display by the processing system 12.

Drilling control signals can be generated by the processing system 12 (e.g., based on the raw data collected by the measurement tools 11) and conveyed downhole or can be generated within the downhole electronic components 9 or by a combination of the two according to embodiments of the present disclosure. The downhole electronic components 9 and the processing system 12 can each include one or more processors and one or more memory devices. In alternate embodiments, computing resources such as the downhole electronic components 9, sensors, and other tools can be located along the carrier 5 rather than being located in the BHA 13, for example. The borehole 2 can be vertical as shown or can be in other orientations/arrangements (see, e.g., FIG. 3A, FIG. 3B).

Figure 2:
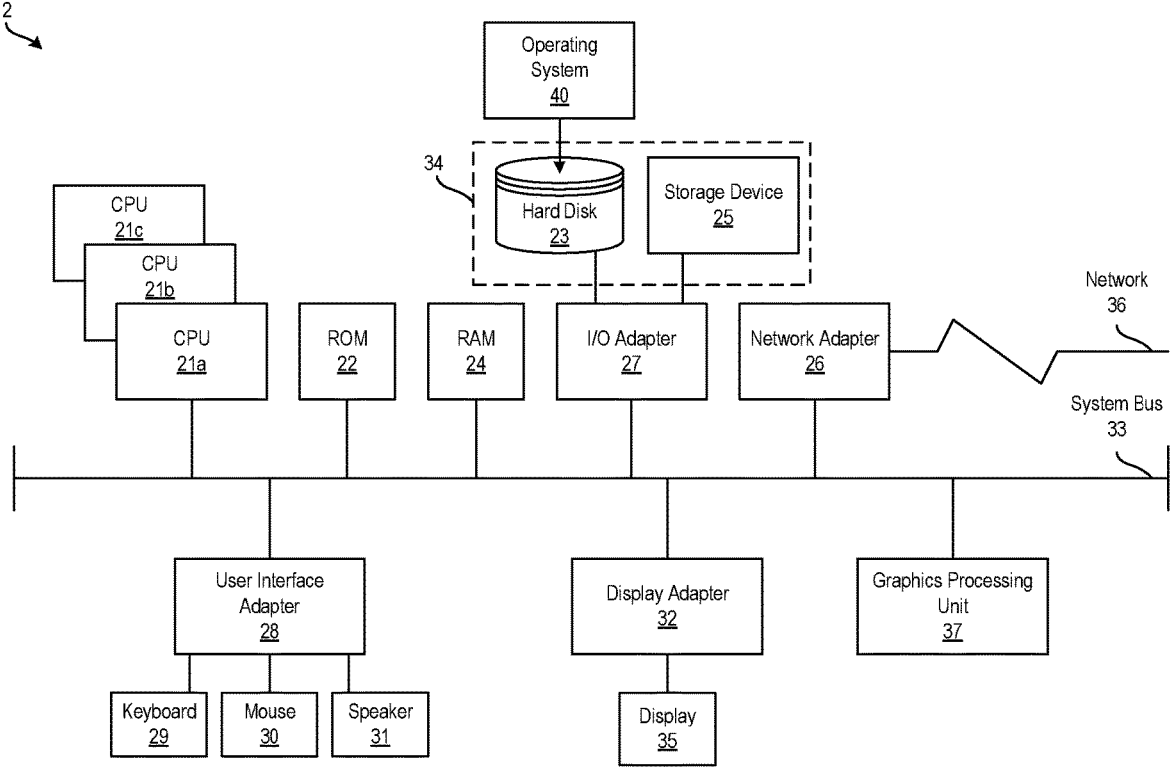
FIG. 2 depicts a block diagram of the processing system of FIG. 1, which can be used for implementing the present techniques herein according to one or more embodiments described herein.

It is to be understood that embodiments of the present disclosure are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units 21a, 21b, 21c, etc. (collectively or generically referred to as processor(s) 21 and/or as processing device(s) 21). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a network adapter 26 coupled to system bus 33. I/O adapter 27 can be a small computer system interface (SCSI) adapter that communicates with a memory, such as a hard disk 23 and/or a tape storage device 25 or any other similar component. I/O adapter 27 and memory, such as hard disk 23 and tape storage device 25 are collectively referred to herein as mass storage 34. Operating system 40 for execution on the processing system 12 can be stored in mass storage 34. The network adapter 26 interconnects system bus 33 with an outside network 36 enabling processing system 12 to communicate with other systems. There are two main types of LCA. An attributional LCA intends to justify the environmental impact for individual products or services, whereas a consequential LCA examines consequences in related systems due to a change in the main system. Which type of LCA that should be applied depends on the nature of the studied system. The developed model for drilling and completion fluid operations can apply both type of LCA's.

A display (e.g., a display monitor) 35 is connected to system bus 33 by display adapter 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24 and mass storage 34), input means such as keyboard 29 and mouse 30, and output capability including speaker 31 and display 35. In some aspects of the present disclosure, a portion of system memory (e.g., RAM 24 and mass storage 34) collectively store an operating system to coordinate the functions of the various components shown in processing system 12.

Turning now to FIG. 3, a flow diagram of a method 300 for evaluating hydrocarbon exploration and recovery operational fluids based on carbon footprint is shown according to one or more embodiments described herein. The method 300 can be performed by any suitable controller, device, and/or system, such as the processing system 12 of FIGS. 1 and 2.

The method 300 begins, and at block 301, the processing system 12 performs an emissions lifecycle analysis for the fluid. The emissions lifecycle analysis analyzes multiple emissions factors for the fluid throughout its life from raw material production that is used to manufacture the fluid through transportation, use, and disposal of the fluid. For example, the emissions lifecycle analysis at block 301 can include performing, at block 302, a manufacturing emissions analysis for the fluid. The manufacturing emissions analysis is described further with reference to FIGS. 4 and 5A. Additionally or alternatively, the emissions lifecycle analysis at block 301 can include performing, at block 304, a transportation emissions analysis for the fluid. The transportation emissions analysis is described further with reference to FIGS. 4 and 5B. Additionally or alternatively, the emissions lifecycle analysis at block 301 can include performing, at block 306, an operational emissions analysis for the fluid. The operational emissions analysis is described further with reference to FIGS. 4 and 5C. Additionally or alternatively, the emissions lifecycle analysis at block 301 can include performing, at block 308, a disposal emissions analysis for the fluid. The disposal emissions analysis is described further with reference to FIGS. 4 and 5D.

With continuing reference to FIG. 3, at block 310, the processing system 12 determines a greenhouse gas emissions value for the fluid based at least in part on a result of the emissions lifecycle analysis from block 301. Determining the GHG emissions value for the fluid can be based on one or more of the manufacturing emissions analysis (block 302), the transportation emissions analysis (block 304), the operational emissions analysis (block 306), and/or the disposal emissions analysis (block 308).

At block 312, the processing system 12 modifies a portion of the hydrocarbon exploration and recovery operation (e.g., the wellbore operation system 100 of FIG. 1) based at least in part on the greenhouse gas emissions value from block 310 as described further herein.

Additional processes also may be included, and it should be understood that the process depicted in FIG. 3 represents an illustration, and that other processes may be added or existing processes may be removed, modified, or rearranged without departing from the scope of the present disclosure. Further features and functions of the method 300 are now described with reference to FIGS. 4 and 5A-5D but are not so limited.

Figure 4:
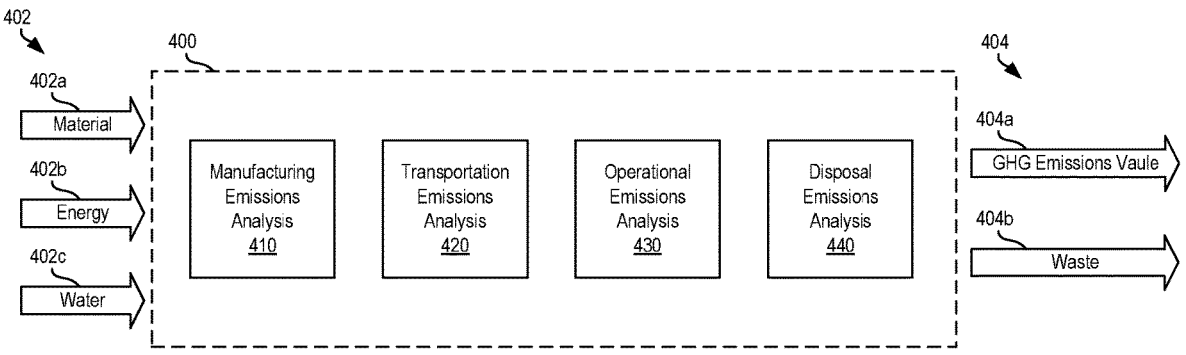
FIG. 4 depicts a block diagram of a model for evaluating hydrocarbon exploration and recovery operational fluids based on carbon footprint according to one or more embodiments described herein.

FIG. 4 depicts a block diagram of a model 400 for evaluating hydrocarbon exploration and recovery operational fluids based on carbon footprint according to one or more embodiments described herein. The model 400 performs an emissions lifecycle analysis (e.g., the emissions lifecycle analysis 301 of FIG. 3) for a fluid used in a hydrocarbon exploration and recovery operation (e.g., the wellbore operation system 100 of FIG. 1).

The model 400 can receive input(s) 402 that influence emissions of fluids, such as drilling or completion fluids. Examples of such inputs include material 402a, energy 402b, and water 402c. The material 402a provides information about the amount and type of material(s) used to manufacture, transport, use, and/or dispose of the fluid. The energy 402b provides information about what kind and how much energy is used to manufacture, transport, use, and/or dispose of the fluid. The water 402c provides information about the amount of water used to manufacture, transport, use, and/or dispose of the fluid.

The model 400 then performs the emissions lifecycle analysis using the input(s) 402. For example, the model 400 performs a manufacturing emissions analysis 410, a transportation emissions analysis 420, an operational emissions analysis 430, and/or a disposal emissions analysis 440. The analyses 410, 420, 430, 440 are shown in detail in FIGS. 5A-5D, respectively, and are now described in more detail.

Figure 5A:
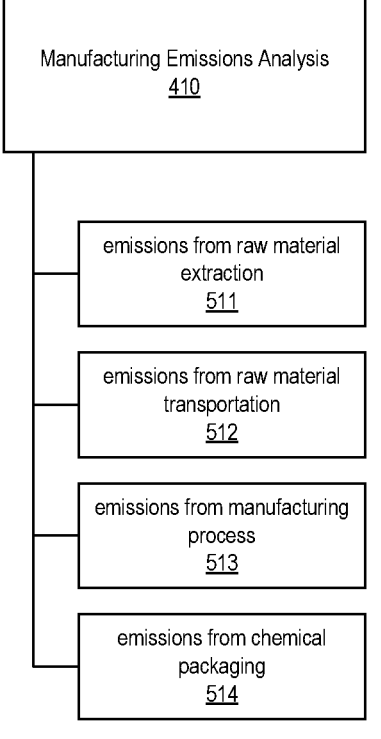
FIG. 5A depicts the manufacturing emissions analysis of FIG. 4 according to one or more embodiments described herein.

Particularly, FIG. 5A depicts the manufacturing emissions analysis 410 of FIG. 4 according to one or more embodiments described herein. According to an example as shown in FIG. 5A, the manufacturing emissions analysis 410 can be based at least in part on emissions from extraction of a raw material for manufacturing the fluid (block 511) (e.g., how much emissions are generated from extracting raw material(s) used to manufacture the fluid), emissions from transportation of the raw material for manufacturing the fluid (block 512) (e.g., how much emissions are generated from transporting the raw materials used to manufacture the fluid), emissions from a manufacturing process for manufacturing the fluid (block 513) (e.g., how much emissions are generated from manufacturing the fluid), emissions from chemical packaging for packaging the fluid (block 514) (e.g., how much emissions are generated from creating the packaging for the fluid and for packaging the fluid), and/or the like, including combinations and/or multiples thereof.

An example of the manufacturing emissions analysis 410 is now described, but the techniques described herein are not so limited. There are mainly two types of processes involved in fluids manufacturing: conventional and solution mining and extraction and synthetic manufacturing. A GHG emissions calculation workflow for manufacturing emissions analysis 410 can output GHG emissions per tonnes of chemical/additive produced based on monthly chemical/additive production and monthly energy consumption (e.g., natural gas, diesel, gasoline, electricity, and/or the like, including combinations and/or multiples thereof). The manufacturing emissions analysis 410 performs a calculation, for example, based on the following equation:

$$EnergyIntensity\left(\frac{kWh}{tonne}\right) = \frac{EnergyConsumed(kWh)_{(x)}}{\text{Monthly Production of}}$$
$$\text{Chemical or Additive (tonnes)}$$

where "x" is a type of fuel utilized (e.g., natural gas, diesel, gasoline, electricity)

According to an embodiment, the example for manufacturing emissions analysis 410 is now applied for calculating product emissions for potassium chloride (KCl). The inputs (e.g., the inputs 402) are as follows: monthly production is $2.31 \times 10^5$ tonnes of KCl, monthly energy consumed (electricity) is $4.91 \times 10^6$ kWh, monthly energy consumed (diesel) is $1.11 \times 10^6$ kWh, and monthly energy consumed (natural gas) is $6.17 \times 10^3$ kWh. The emissions for KCl is calculated as follows using the above equation. Particularly, energy intensity in kWh/tonne of KCl is 21.28 kWh/tonne for electricity, 4.76 kWh/tonne for diesel, and 0.03 kWh/tonne for natural gas. The GHG emissions value for KCl production can then be calculated in terms of Kg of $CO_2$ equivalent (eq.) per tonnes of KCl using the following equation:

$$GHG \text{ Emissions} = EnergyIntensity\left(\frac{kWh}{\text{tonnes of KCl}}\right) \times$$
$$\frac{\text{Volume of Fuel Consumed}}{kWh} \times \frac{\text{Kg of } CO_2 \text{ eq.}}{\text{Volume of fuel consumed}}$$

Based on the foregoing, the GHG emissions (electricity) for KCl is 4.25 Kg of $CO_2$ eq./tonne of KCl, the GHG emissions (diesel) for KCl is 1.22 Kg of $CO_2$ eq./tonne of KCl, and the GHG emissions (natural gas) for KCl is 0.0005 Kg of $CO_2$ eq./tonne of KCl. The total GHG emissions for KCl is the sum of these individual emissions values, namely 5.4705 Kg of $CO_2$ eq./tonne of KCl. This is merely an example, and the materials emissions analysis 410 of FIGS. 4 and 5A can be performed for other types of chemicals.

Figure 5C:
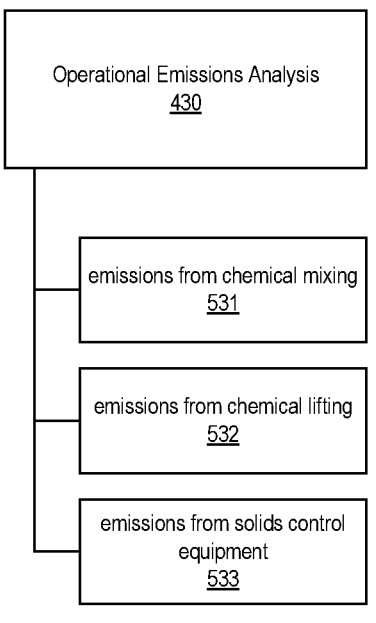
FIG. 5C depicts the operational emissions analysis of FIG. 4 according to one or more embodiments described herein.
Figure 5B:
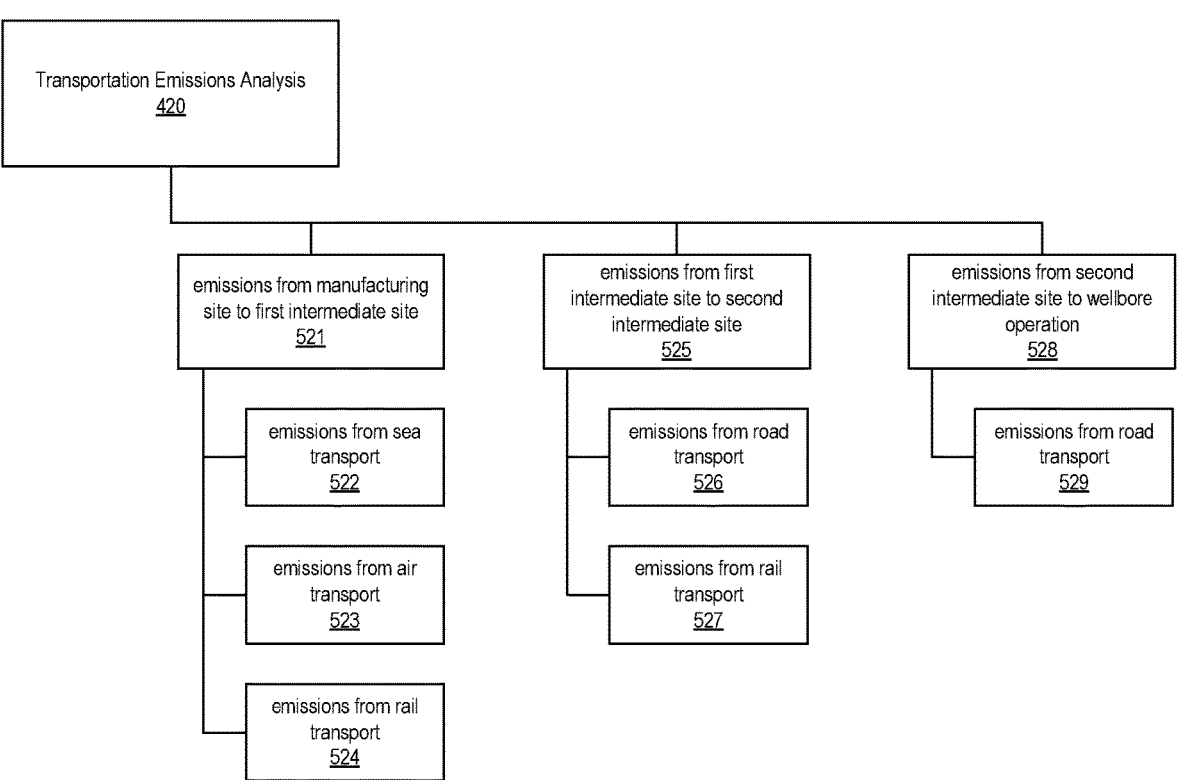
FIG. 5B depicts the transportation emissions analysis of FIG. 4 according to one or more embodiments described herein.

FIG. 5B depicts the transportation emissions analysis 420 of FIG. 4 according to one or more embodiments described herein. According to an example as shown in FIG. 5B, the transportation emissions analysis 420 can be based at least in part on emissions from transporting the fluid from a first location to a second location and emissions from transporting the fluid from the second location to a third location. For example, the transportation emissions analysis 420 can be based at least in part on emissions from transporting the fluid from a manufacturing site to a first intermediate site (block 521), emissions from transporting the fluid from the first intermediate site to a second intermediate site (block 525), emissions from the second intermediate site to the wellbore operation (block 528), and/or the like, including combinations and/or multiples thereof. An example of the first intermediate site is a supplier facility, and an example of the second intermediate site is a customer site.

According to an embodiment, the emissions from transporting the fluid from a manufacturing site to a first intermediate site (block 521) can include emissions from sea transport (block 522) (e.g., how much emissions are generated by a ship used to transport the fluid by sea/water), emissions from air transport (block 523) (e.g., how much emissions are generated by an aircraft used to transport the fluid by air), emissions from rail transport (block 524) (e.g., how much emissions are generated by a train used to transport the fluid by rail), and/or the like, including combinations and/or multiples thereof.

According to an embodiment, the emissions from transporting the fluid from the first intermediate site to the second intermediate site (block 525) can include emissions from road transport (block 526) (e.g., how much emissions are generated by a vehicle, such as a truck, used to transport the fluid by road), emissions from rail transport (block 527) (e.g., how much emissions are generated by a train used to transport the fluid by rail), and/or the like, including combinations and/or multiples thereof.

According to an embodiment, the emissions from transporting the fluid from the second intermediate site to the wellbore operation (block 528) can include emissions from road transport (block 529) (e.g., how much emissions are generated by a vehicle, such as a truck, used to transport the fluid by road) and/or the like, including combinations and/or multiples thereof.

For the transportation emissions analysis 420, the emissions for various transportation methods (e.g., rail, air, sea, road, and/or the like, including combinations and/or multiples thereof) can be estimated based on available data for these types of transportation and/or can be based on actual data provided by, for example, transportation companies. For example, emissions for sea transport can be based on emissions data for sea-based transport in general or based on emissions data for a particular ship or ships used to transport the fluid. Further, the emissions values for transportation emissions analysis 420 can be based on distances traveled for each transport. For example, the emissions for a particular transport method (e.g., air) can be adjusted based on how far the fluid was transported by this transport method relative to other transport methods in the supply chain (e.g., rail, sea, road).

An example of the manufacturing emissions analysis 410 for soda ash consumption at a hydrocarbon exploration and recovery operation (e.g., wellbore operation system 100) is now described; however, the techniques described herein are not so limited, and this is merely an example. $CO_2$ is produced in the process of calcinating trona (ore) (e.g., process emissions). Combustion emissions (e.g., stationary emissions) associated with the production of soda ash are also generated and may include fuel inputs used to power fire ore crushers, coal crushers, trona ore driers, industrial boilers, and/or the like, including combinations and/or multiples thereof.

For process emissions, the process of converting trona into soda ash generates $CO_2$ according to the following chemical equation:

$$2Na_2CO_3 \cdot NaHCO_3 \cdot 2H_2O \rightarrow 3Na_2CO_3 + 5H_2O + CO_2.$$

Thus, when considering the molecular weights of Na as 23 g/mol, C as 12 g/mol, O as 16 g/mol, and H as 1 g/mol, 452 g of trona generates 318 g of soda ash and 44 g of $CO_2$. Thus, the conversion of trona into soda ash generates GHG. Thus, for each 10.27 g of trona, 1 g of $CO_2$ is generated, and thus for each 10.27 tonne of trona, 1 tonne of $CO_2$ is generated. This results in an emissions factor (EF) of 0.097 tonne of $CO_2$/tonne of trona consumed. For each 318 g of soda ash produced, 44 g of $CO_2$ is produced, which results in an EF of 0.138 tonne of $CO_2$/tonne of soda ash produced or 138 kg of $CO_2$/tonne of soda ash produced according to the formula emissions equals the emissions factor multiplied by the amount of soda ash produced or trona consumed.

For stationary emissions (e.g., emissions from chemical packaging 514) lifecycle estimates can be made based on the following table of emissions data:

| Fuel Type | Fuel Consumed per tonne of Soda Ash Production | Emission factors of Fuels |
|---|---|---|
| Coal | 107.6 lb = 0.0538 | 2819 kg/short ton |
| Distillate Fuel Oil | 0.067 lb | 10.96 kg $CO_2$/gallon |
| Residual Fuel Oil | 0.185 gal | 11.27 kg $CO_2$/gallon |
| Natural Gas | 797.5 ft³ | 0.054 kg/scf |

According to this table, the stationary emissions per tonne of soda ash is calculated as follows:

$$=(0.0538 \times 2819) + (0.067 \times 10.96) + (0.185 \times 11.27) + (797.5 \times 0.0544) = 151.7 + 0.734 + 2.085 + 43.39 = 197.91$$

That is, according to this analysis, the stationary emissions per tonne of soda ash is 197.91 $kgCO_2$/tonne of soda ash produced.

To determine the total emissions for soda ash produced, the production and stationary emissions for soda ash production or consumption can be added together to determine that the production of soda ash generates 335.91 Kg $CO_2$/tonne of soda ash produced/consumed.

FIG. 5C depicts the operational emissions analysis 430 of FIG. 4 according to one or more embodiments described herein. According to an example as shown in FIG. 5C, the operational emissions analysis 430 can be based at least in part on emissions from chemical mixing (block 531) (e.g., how much emissions chemical mixing equipment generates), emissions from chemical lifting (block 532) (e.g., how much emissions chemical lifting equipment generates), and emissions from solids control equipment (block 533) (e.g., how much emissions solids control equipment generates).

Figure 5D:
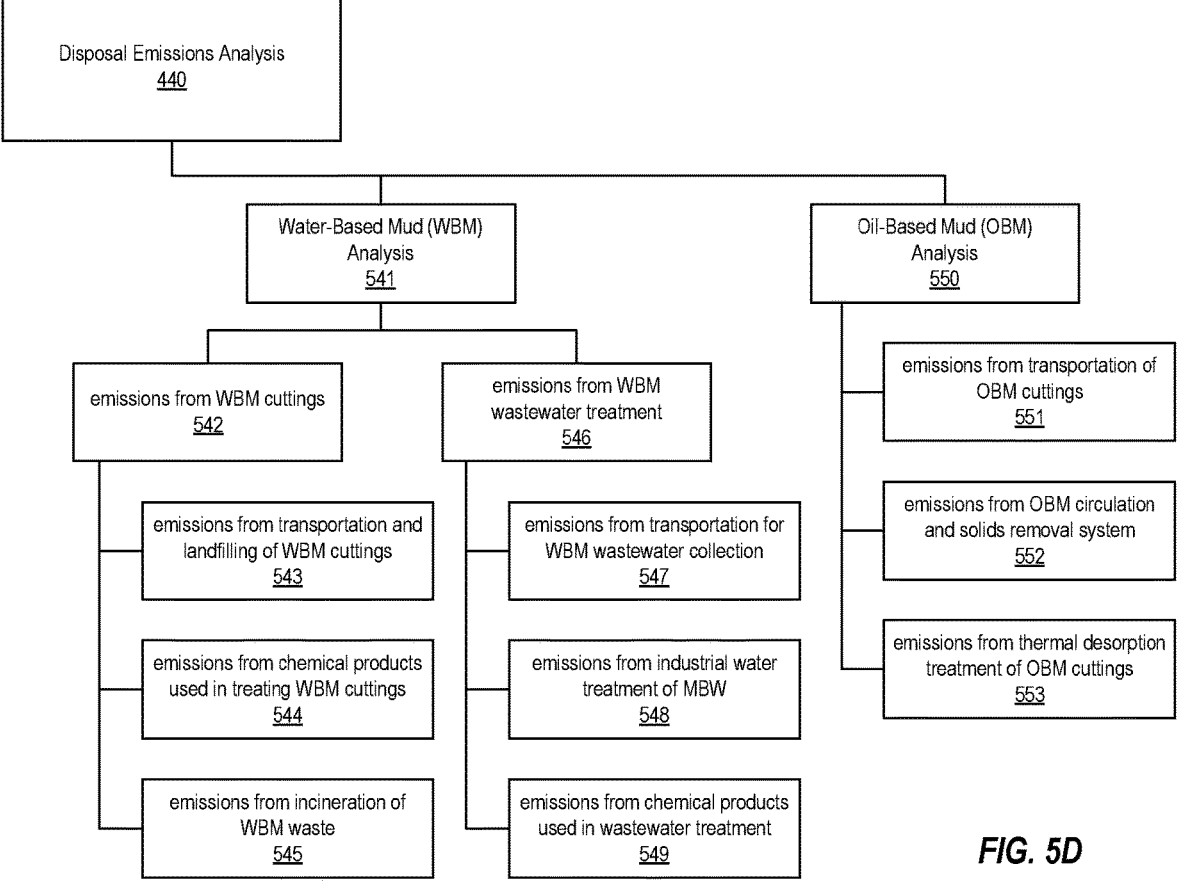
FIG. 5D depicts the disposal emissions analysis of FIG. 4 according to one or more embodiments described herein.

FIG. 5D depicts the disposal emissions analysis 440 of FIG. 4 according to one or more embodiments described herein. According to an example as shown in FIG. 5D, the disposal emissions analysis 440 can be based at least in part on water-based mud analysis (block 541), an oil-based mud analysis (block 550), and/or the like, including combinations and/or multiples thereof.

According to an embodiment, the water-based mud analysis (block 541) is based at least in part on emissions from water-based mud cutting (block 542), emissions from water-based mud wastewater treatment (block 546), and/or the like, including combinations and/or multiples thereof. According to an embodiment, the emissions from water-based mud cutting (block 542) is based at least in part on emissions from transportation and landfilling of water-based mud cuttings (block 543), emissions from chemical products used in treating water-based mud cuttings (block 544), emissions from incineration of water-based mud waste (block 545), and/or the like, including combinations and/or multiples thereof. According to an embodiment, the emissions from water-based mud wastewater treatment (block 546) is based at least in part on emissions from transportation for water-based mud wastewater collection (block 547), emissions from industrial water treatment of water-based mud (block 548), emissions from chemical products used in wastewater treatment (block 549), according to one or more embodiments described herein.

According to an embodiment, the oil-based mud analysis (block 550) is based at least in part on emissions from transportation of oil-based mud cuttings (block 551), emissions from an oil-based mud circulation and solids removal system (block 552), emissions from thermal desorption treatment of oil-based mud cuttings (block 553).

Values for the various portions of the disposal emissions analysis 540 (e.g., blocks 541-553) can be estimated based on available data for these types of processes and/or can be based on actual data provided by, for example, companies that make the equipment or provide the services involved in the disposal of the fluid.

Returning to FIG. 4, the model 400, upon performing the emissions lifecycle analysis, generates output 404, which includes one or more of a greenhouse gas emissions value 404a or a waste value 404b. The GHG emissions value 404a indicates how much GHG emissions a fluid generates over its lifecycle, from raw material production that is used to manufacture the fluid through transportation, operations, and disposal of the fluid. Generally, the higher the GHG emissions value 404a, the higher the carbon footprint of the fluid, making a lower GHG emissions value preferable to a higher GHG emissions value. As an example, the GHG emissions value 404a can be a sum of the GHG emissions from each of the analyses 410, 420, 430, 440.

The GHG emissions value 404a can be used to modify a portion of the hydrocarbon exploration and recovery operation, such as to select a different fluid, change how the fluid is manufactured, change how the fluid is transported, change how the fluid is used at the operation, change how the fluid is disposed, and/or the like, including combinations and/or multiples thereof. For example, a fluid with a lower GHG emissions value can be used instead of a fluid with a higher GHG emissions value. As another example, a mode of transporting the fluid can be changed to reduce the GHG emissions value or the source country of chemical (e.g., supply chain optimization) can be changed to reduce to reduce GHG emissions According to one or more embodiments described herein, the method 300 of FIG. 3 and/or the model 400 of FIG. 4 can provide for determining environmental efficiency of chemicals manufacturing facilities on a per-product basis, can determine which product is more environmentally and cost friendly from a selection of products for a particular project, can provide updates for material safety data sheets (MSDS) of products with environmental footprint information for each product, can simulate carbon footprint for different fluids, and can reduce overall emissions for hydrocarbon exploration and recovery operations, and/or the like, including combinations and/or multiples thereof.

Example embodiments of the disclosure include or yield various technical features, technical effects, and/or improvements to technology. Example embodiments of the disclosure provide technical solutions for evaluating hydrocarbon exploration and recovery operational fluids (e.g., drilling fluids, completion fluids, and/or the like, including combinations and/or multiples thereof) based on carbon footprint of the fluids. As a result, a carbon footprint of hydrocarbon exploration and recovery operations can be reduced.

Set forth below are some embodiments of the foregoing disclosure:

Embodiment 1: A method for evaluating greenhouse gas emissions for a fluid for a hydrocarbon exploration and recovery operation, the method comprising: performing an emissions lifecycle analysis for the drilling and completion fluid; determining a greenhouse gas emissions value for the drilling and completion fluid based at least in part on a result of the emissions lifecycle analysis; and modifying a portion of the hydrocarbon exploration and recovery operation based at least in part on the greenhouse gas emissions value.

Embodiment 2: A method according to any prior embodiment, wherein performing the emissions lifecycle analysis for the fluid comprises performing a manufacturing emissions analysis for the fluid.

Embodiment 3: A method according to any prior embodiment, wherein determining the greenhouse gas emissions value for the fluid is based at least in part on a result of the manufacturing emissions analysis.

Embodiment 4: A method according to any prior embodiment, wherein performing the emissions lifecycle analysis for the fluid comprises performing a transportation emissions analysis for the fluid.

Embodiment 5: A method according to any prior embodiment, wherein determining the greenhouse gas emissions value for the fluid is based at least in part on a result of the transportation emissions analysis.

Embodiment 6: A method according to any prior embodiment, wherein performing the emissions lifecycle analysis for the fluid comprises performing an operational emissions analysis for the fluid.

Embodiment 7: A method according to any prior embodiment, wherein determining the greenhouse gas emissions value for the fluid is based at least in part on a result of the operational emissions analysis.

Embodiment 8: A method according to any prior embodiment, wherein performing the emissions lifecycle analysis for the fluid comprises performing a disposal emissions analysis for the fluid.

Embodiment 9: A method according to any prior embodiment, wherein determining the greenhouse gas emissions value for the fluid is based at least in part on a result of the disposal emissions analysis.

Embodiment 10: A system comprising: a memory storing computer readable instructions; and a processing device for executing the computer readable instructions, the computer readable instructions controlling the processing device to perform operations for evaluating greenhouse gas emissions for a fluid for a hydrocarbon exploration and recovery operation, the operations comprising: performing a manufacturing emissions analysis for the fluid; performing a transportation emissions analysis for the fluid; performing an operational emissions analysis for the fluid; performing a disposal emissions analysis for the fluid; determining a greenhouse gas emissions value for the fluid based at least in part on a result of the manufacturing emissions analysis, a result of the transportation emissions analysis, a result of the operational emissions analysis, and a result of the disposal emissions analysis; and modifying a portion of the hydrocarbon exploration and recovery operation based at least in part on the greenhouse gas emissions value.

Embodiment 11: A system according to any prior embodiment, wherein the manufacturing emissions analysis is based at least in part on emissions from extraction of a raw material for manufacturing the fluid, emissions from transportation of the raw material for manufacturing the fluid, emissions from a manufacturing process for manufacturing the fluid, and emissions from chemical packaging for packaging the fluid.

Embodiment 12: A system according to any prior embodiment, wherein the transportation emissions analysis is based at least in part on emissions from transporting the fluid from a first location to a second location and emissions from transporting the fluid from the second location to a third location.

Embodiment 13: A system according to any prior embodiment, wherein the first location is a location associated with the manufacturing process, and wherein the third location is the hydrocarbon exploration and recovery operation.

Embodiment 14: A system according to any prior embodiment, wherein the emissions from transporting the fluid from the first location to the second location is based at least in part on emissions from sea transportation, emissions from air transportation, and emissions from rail transportation.

Embodiment 15: A system according to any prior embodiment, wherein the emissions from transporting the fluid from the second location to the third location is based at least in part on emissions from road transportation and emissions from rail transportation.

Embodiment 16: A system according to any prior embodiment, wherein the operational emissions analysis is based at least in part on emissions from chemical mixing, emissions from chemical lifting, and emissions from solids control equipment.

Embodiment 17: A system according to any prior embodiment, wherein the disposal emissions analysis is based at least in part on a water-based mud analysis and an oil-based mud analysis.

Embodiment 18: A system according to any prior embodiment, wherein the water-based mud analysis is based at least in part on emissions from water-based mud cutting, wherein the emissions from water-based mud cutting is based at least in part on emissions from transportation and landfilling of water-based mud cuttings, emissions from chemical products used in treating water-based mud cuttings, and emissions from incineration of water-based mud waste.

Embodiment 19: A system according to any prior embodiment, wherein the water-based mud analysis is based at least in part on emissions from water-based mud wastewater treatment, wherein the emissions from water-based mud wastewater treatment is based at least in part on emissions from transportation for water-based mud wastewater collection, emissions from industrial water treatment of water-based mud, and emissions from chemical products used in wastewater treatment.

Embodiment 20: A system according to any prior embodiment, wherein the oil-based mud analysis is based at least in part on emissions from transportation of oil-based mud cuttings, emissions from an oil-based mud circulation and solids removal system, and emissions from thermal desorption treatment of oil-based mud cuttings.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations (e.g., exploration wells, wild cat wells, workover wells, plug and abandonment wells, EOR wells and/or the like, including combinations and/or multiples thereof). These operations can involve using one or more treatment agents (e.g., drilling fluid or completion fluid chemicals) to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method for conducting hydrocarbon exploration and recovery operation implemented by hydrocarbon exploration and recover apparatus that uses a drilling fluid and a completion fluid, the method comprising:

developing, using a computer processing system, a model of an emissions lifecycle analysis for the drilling fluid and the completion fluid, the model comprising a plurality of blocks modeling various phases of greenhouse gas (GHG) emissions for each of the drilling fluid and the completion fluid, the plurality of blocks comprising: a first block modeling GHG emissions from a manufacturing process and having a first chemical composition choice that influences the associated GHG emissions; a second block modeling GHG emission from operations and having a second chemical composition choice that influences the associated GHG emissions; and a third block modeling GHG emissions from disposal and having a third chemical composition choice that influences the associated GHG emissions;

determining, using the computer processing system and the model, a greenhouse gas emissions value for the drilling fluid and the completion fluid for multiple possibilities in which at least one of the first chemical composition choice, the second chemical composition choice, or the third chemical composition choice for each of the drilling fluid and the completion fluid are varied for each possibility;

selecting, using the computer processing system, one of the first chemical composition choice, the second chemical composition choice, or the third chemical composition choice for each of the drilling fluid and the completion fluid from the multiple possibilities that reduces total GHG emissions;

conducting the hydrocarbon exploration and recovery operation with the hydrocarbon exploration and recovery apparatus using drilling fluid having a first drilling fluid chemical composition and a completion fluid having a first completion fluid chemical composition;

modifying the hydrocarbon exploration and recovery operation to change at least one of (i) the first drilling fluid chemical composition to a second drilling fluid chemical composition or (ii) the first completion fluid chemical composition to a second completion fluid chemical composition to reduce the total GHG emissions, the second drilling fluid chemical composition and the second completion fluid chemical composition being from the selected choice;

wherein a disposal emissions analysis in the third block is based at least in part on a water-based mud analysis and an oil-based mud analysis and the water-based mud analysis is based at least in part on GHG emissions from water-based mud cuttings, wherein the GHG emissions from water-based mud cuttings is based at least in part on GHG emissions from transportation and landfilling of water-based mud cuttings, GHG emissions from chemical products used in treating water-based mud cuttings, and GHG emissions from incineration of water-based mud waste.

2. The method of claim 1, wherein performing a manufacturing emissions analysis for the drilling fluid and the completion fluid in the first block comprises determining GHG emissions for material extraction.

3. The method of claim 1, wherein performing a manufacturing emissions analysis for the drilling fluid and the completion fluid in the first block comprises determining GHG emissions for packaging.

4. The method of claim 1, wherein the model further comprises a fourth block for performing a transportation emissions analysis for the drilling fluid and the completion fluid by determining GHG emissions for a mode of transportation.

5. The method of claim 4, wherein the mode of transportation comprises multiple modes of transportation.

6. The method of claim 1, wherein performing an operational emissions analysis for the drilling fluid and the completion fluid in the second block comprises determining GHG emissions from chemical mixing and/or chemical lifting equipment.

7. The method of claim 1, wherein performing an operational emissions analysis for the drilling fluid and the completion fluid in the third block comprises determining GHG emissions for solids control equipment.

8. The method of claim 1, wherein water-based mud cuttings are being disposed and performing a disposal emissions analysis for the drilling fluid and the completion fluid in the fourth block comprises determining GHG emissions from at least one of landfilling, chemical used in treating, incineration, or industrial water treatment.

9. The method of claim 1, wherein oil-based mud cuttings are being disposed and performing a disposal emissions analysis for the drilling fluid and the completion fluid in the third block comprises determining GHG emissions from a thermal desorption treatment.

10. A system for conducting a hydrocarbon exploration and recovery operation that uses a drilling fluid and a completion fluid, the system comprising:

an apparatus for implementing the hydrocarbon exploration and recovery operation using the drilling fluid having a first drilling fluid chemical composition and a completion fluid having a first completion fluid chemical composition;

a memory storing computer readable instructions; and a processing device for executing the computer readable instructions, the computer readable instructions controlling the processing device to perform operations comprising:

developing, using a computer processing system, a model of an emissions lifecycle analysis for the drilling fluid and the completion fluid, the model comprising a plurality of blocks modeling various phases of greenhouse gas (GHG) emissions for each of the drilling fluid and the completion fluid, the plurality of blocks comprising: a first block modeling GHG emissions from a manufacturing process and having a first chemical composition choice that influences the associated GHG emissions; a second block modeling GHG emissions from operations having a second chemical composition choice that influences the associated GHG emissions; and a third block modeling GHG emissions from disposal and having a third chemical composition choice that influences the associated GHG emissions;

determining a greenhouse gas emissions value for the drilling fluid based and the completion fluid for multiple possibilities in which at least one of the first chemical composition choice, the second chemical composition choice, or the third chemical composition choice are varied for each possibility;

selecting one of the first chemical composition choice, the second chemical composition choice, or the third chemical composition choice for each of the drilling fluid and the completion fluid from the multiple possibilities that reduces total GHG emissions;

modifying the hydrocarbon exploration and recovery operation to change at least one of (i) the first drilling fluid chemical composition to a second drilling fluid chemical composition or (ii) the first completion fluid chemical composition to a second completion fluid chemical composition to reduce the total GHG emissions, the second drilling fluid chemical composition and the second completion fluid chemical composition being from the selected choice;

wherein a disposal emissions analysis in the third block is based at least in part on a water-based mud analysis and an oil-based mud analysis and the water-based mud analysis is based at least in part on GHG emissions from water-based mud cuttings, wherein the GHG emissions from water-based mud cuttings is based at least in part on GHG emissions from transportation and landfilling of water-based mud cuttings, GHG emissions from chemical products used in treating water-based mud cuttings, and GHG emissions from incineration of water-based mud waste.

11. The system of claim 10, wherein a manufacturing emissions analysis for the first block is based at least in part on GHG emissions from extraction of a raw material for manufacturing the drilling fluid and the completion fluid, GHG emissions from transportation of the raw material for manufacturing the drilling fluid and the completion fluid, GHG emissions from a manufacturing process for manufacturing the drilling fluid and the completion fluid, and GHG emissions from chemical packaging for packaging the drilling fluid and the completion fluid.

12. The system of claim 10, wherein the model further comprises a fourth block for a transportation emissions analysis that is based at least in part on GHG emissions from transporting the drilling fluid and the completion fluid from a first location to a second location and GHG emissions from transporting the drilling fluid and the completion fluid from the second location to a third location.

13. The system of claim 12, wherein the first location is a location associated with the manufacturing process, and wherein the third location is the hydrocarbon exploration and recovery operation.

14. The system of claim 12, wherein the GHG emissions determined in the fourth block from transporting the drilling fluid and the completion fluid from the first location to the second location is based at least in part on GHG emissions from sea transportation, GHG emissions from air transportation, and GHG emissions from rail transportation.

15. The system of claim 12, wherein the GHG emissions determined in the fourth block from transporting the drilling fluid and the completion fluid from the second location to the third location is based at least in part on GHG emissions from road transportation and GHG emissions from rail transportation.

16. The system of claim 10, wherein an operational emissions analysis in the second block is based at least in part on emissions from chemical mixing, emissions from chemical lifting, and emissions from solids control equipment.

17. The system of claim 10, wherein the oil-based mud analysis is based at least in part on GHG emissions from transportation of oil-based mud cuttings, GHG emissions from an oil-based mud circulation and solids removal system, and GHG emissions from thermal desorption treatment of oil-based mud cuttings.

18. A system for conducting a hydrocarbon exploration and recovery operation that uses a drilling fluid and a completion fluid, the system comprising:

an apparatus for implementing the hydrocarbon exploration and recovery operation using the drilling fluid having a first drilling fluid chemical composition and a completion fluid having a first completion fluid chemical composition;

a memory storing computer readable instructions; and a processing device for executing the computer readable instructions, the computer readable instructions controlling the processing device to perform operations comprising:

developing, using a computer processing system, a model of an emissions lifecycle analysis for the drilling fluid and the completion fluid, the model comprising a plurality of blocks modeling various phases of greenhouse gas (GHG) emissions for each of the drilling fluid and the completion fluid, the plurality of blocks comprising: a first blockmodeling GHG emissions from a manufacturing process and having a first chemical composition choice that influences the associated GHG emissions; a second block modeling GHG emissions from operations having a second chemical composition choice that influences the associated GHG emissions; and a third block modeling GHG emissions from disposal and having a third chemical composition choice that influences the associated GHG emissions;

determining a greenhouse gas emissions value for the drilling fluid based and the completion fluid for multiple possibilities in which at least one of the first chemical composition choice, the second chemical composition choice, or the third chemical composition choice are varied for each possibility;

selecting one of the first chemical composition choice, the second chemical composition choice, or the third chemical composition choice for each of the drilling fluid and the completion fluid from the multiple possibilities that reduces total GHG emissions;

modifying the hydrocarbon exploration and recovery operation to change at least one of (i) the first drilling fluid chemical composition to a second drilling fluid chemical composition or (ii) the first completion fluid chemical composition to a second completion fluid chemical composition to reduce the total GHG emissions, the second drilling fluid chemical composition and the second completion fluid chemical composition being from the selected choice;

wherein a disposal emissions analysis in the third block is based at least in part on a water-based mud analysis and an oil-based mud analysis; wherein the water-based mud analysis is based at least in part on GHG emissions from water-based mud wastewater treatment, and the GHG emissions from water-based mud wastewater treatment is based at least in part on GHG emissions from transportation for water-based mud wastewater collection, GHG emissions from industrial water treatment of water-based mud, and GHG emissions from chemical products used in wastewater treatment.

19. A method for conducting hydrocarbon exploration and recovery operation implemented by hydrocarbon exploration and recover apparatus that uses a drilling fluid and a completion fluid, the method comprising:

developing, using a computer processing system, a model of an emissions lifecycle analysis for the drilling fluid and the completion fluid, the model comprising a plurality of blocks modeling various phases of greenhouse gas (GHG) emissions for each of the drilling fluid and the completion fluid, the plurality of blocks comprising: a first block modeling GHG emissions from a manufacturing process and having a first chemical composition choice that influences the associated GHG emissions; a second block modeling GHG emission from operations and having a second chemical composition choice that influences the associated GHG emissions; and a third block modeling GHG emissions from disposal and having a third chemical composition choice that influences the associated GHG emissions;

determining, using the computer processing system and the model, a greenhouse gas emissions value for the drilling fluid and the completion fluid for multiple possibilities in which at least one of the first chemical composition choice, the second chemical composition choice, or the third chemical composition choice for each of the drilling fluid and the completion fluid are varied for each possibility;

selecting, using the computer processing system, one of the first chemical composition choice, the second chemical composition choice, or the third chemical composition choice for each of the drilling fluid and the completion fluid from the multiple possibilities that reduces total GHG emissions;

conducting the hydrocarbon exploration and recovery operation with the hydrocarbon exploration and recovery apparatus using drilling fluid having a first drilling fluid chemical composition and a completion fluid having a first completion fluid chemical composition;

modifying the hydrocarbon exploration and recovery operation to change at least one of (i) the first drilling fluid chemical composition to a second drilling fluid chemical composition or (ii) the first completion fluid chemical composition to a second completion fluid chemical composition to reduce the total GHG emissions, the second drilling fluid chemical composition and the second completion fluid chemical composition being from the selected choice;

wherein a disposal emissions analysis in the third block is based at least in part on a water-based mud analysis and an oil-based mud analysis and the water-based mud analysis is based at least in part on GHG emissions from water-based mud wastewater treatment, wherein the GHG emissions from water-based mud wastewater treatment is based at least in part on GHG emissions from transportation for water-based mud wastewater collection, GHG emissions from industrial water treatment of water-based mud, and GHG emissions from chemical products used in wastewater treatment.

* * * * *